United States Patent Office 3,369,027
Patented Feb. 13, 1968

3,369,027
N,N'-DISUBSTITUTED BENZIMIDAZOLONES
Erich Klauke, Cologne-Flittard, Engelbert Kuhle, Bergisch Gladbach, and Fritz Steinfatt, Opladen, Germany, assignors to Farbenfabriken Bayer Aktiengesellschaft, Leverkusen, Germany, a corporation of Germany
No Drawing. Filed Dec. 3, 1965, Ser. No. 511,314
Claims priority, application Germany, Dec. 16, 1964, F 44,728
5 Claims. (Cl. 260—309.2)

ABSTRACT OF THE DISCLOSURE

An N,N'-disubstituted benzimidazolone having high microbial activity, especially as a bactericide, fungicide and useful in imparting an antimicrobial finish to materials.

---

The present invention relates to N,N'-disubstituted imidazolones; more particularly it concerns N,N'-disubstituted imidazolones of the formula

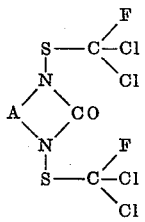

wherein A denotes a phenylene radical which may be substituted by chlorine, nitro and/or by aliphatic radicals containing 1 to 4 carbon atoms.

Furthermore the invention concerns a process for the production of the N,N'-disubstituted imidazolones of the Formula I. This process consists in that imidazolones of the formula

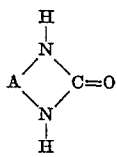

wherein A has the meaning stated above are reacted with sulphenyl halides of the formula

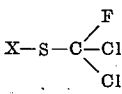

wherein X stands for chlorine or bromine, in a molar ratio of 1 to at least 2.

Representatives of the compounds of Formula II are, for example, benzimidazolone, 4-methyl-benzimidazolone, 5-methyl-benzimidazolone, 5-ethyl-benzimidazolone, 5-nitro-benzimidazolone and 5-chloro-benzimidazolone. Suitable sulphenyl halides of the Formula III are fluoro-dichloromethanesulphenyl chloride and fluoro-dichloromethanesulphenyl bromide.

The reaction is expediently carried out in the presence of acid acceptors, for example, in the presence of tertiary amines, such as triethylamine, in an inert organic solvent, such as benzene, chlorobenzene, acetone, diethyl ether or dioxan, at temperatures between 10 and 100° C., preferably between 20 and 50° C.

The N,N'-disubstituted imidazolones of the present invention have a surprisingly high microbicidal activity, especially against bacteria, mould fungi and yeasts. They can chiefly be used with excellent results for imparting an antimicrobial finish to the most varied materials of natural or synthetic origin, for example, textiles, leather, paper, rubber, polyurethanes and polyvinyl chloride. The necessary amounts of N,N'-disubstituted imidazolones can easily be determined for each case by preliminary experiments; in general, amounts of 0.2 to 2.0%, referred to the weight of the material to be finished, will suffice. The antimicrobial finishing can be carried out in known manner, for example, by impregnating the materials with solutions of the N,N'-disubstituted imidazolones in organic solvents or with aqueous dispersions of the imidazolones, or by incorporating the imidazolones with the materials.

The following examples serve to illustrate the invention without, however, limiting its scope.

Example 1

A solution of 26.8 g. benzimidazolone and 68 g. fluoro-dichloro-methanesulphenyl chloride in 250 ml. benzene is mixed dropwise with 50 g. triethylamine, the temperature being allowed to rise to about 50° C. The reaction mixture is then cooled. The solution is filtered off from the precipitated triethylamine salt and the filtrate evaporated in a vacuum. The residue is treated with a little methanol, subsequently filtered off with suction and dried. 27 g. of the N,N'-disubstituted benzimidazolone of the formula

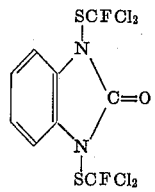

having a melting point of 167.5° C. are obtained.

Example 2

The procedure described in Example 1 is followed, but 29.6 g. 4-methyl-benzimidazolone or 29 g. 5-methyl-benzimidazolone are used, instead of 26.8 g. benzimidazolone. There are then obtained 24 g. of the N,N'-disubstituted imidazolone of the formula

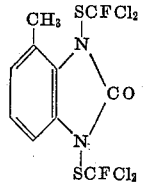

of melting point 118° C. and 36 g. of the N,N'-disubstituted imidazolone of the formula

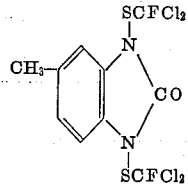

of melting point 105 to 110° C., respectively.

Example 3

A solution of 33.6 g. 5-chloro-benzimidazolone and 68 g. fluoro-dichloro-methanesulphenyl chloride in 250 ml. benzene is mixed dropwise with 45 g. triethylamine, the temperature being allowed to rise to about 60° C. The reaction mixture is stirred for about a further 10 minutes and then cooled. The solution is filtered off from the precipitated triethylamine hydrochloride and the filtrate evaporated in a vacuum. 72 g. of the N,N'-disubstituted benzimidazolone of the formula

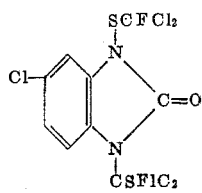

are obtained in the form of a viscous oil.

Example 4

In the production of packing paper, a 0.5% solution of the N,N'-disubstituted imidazolone compound described in Example 1, in ethyl glycol, is sprayed onto the paper web between the wet part and the dry end of the paper machine to such an extent that the dry packing paper contains 0.5% of the imidazolone. The packing paper thus treated proves to be mould-proof even when stored under moist conditions.

When small samples of the packing paper thus treated are placed on agar dishes which have been inoculated with mould fungi, such as *Aspergillus terreus* and *Paecilomyces*, they are not overgrown by the fungi even if the incubation lasts for several weeks; the samples remain surrounded by inhibition zones which are 2 to 4 mm. wide.

Example 5

Polyurethane elastomers are mixed, in the course of the conventional production, with 1% of the N,N'-disubstituted imidazolone compound described in Example 1. Pipe packings which are subsequently produced from the polyurethane elastomers prove to be resistant to bacteria and fungi which cause rotting in the soil.

When samples of the elastomers obtained are placed on agar dishes which have been inoculated with fungi, such as *Aspergillus terreus* and *Chaetomium globosum*, or with bacteria, such as *Bct. proteus*, *Bct. coli*, *B. mesentericus*, *Pseudomonas florescens* and *Stc. aureus*, they exhibit growth inhibition zones of 1 to 8 mm.

Example 6

In the usual production of floor covering, 0.5% of the N,N'-disubstituted imidazolone compound described in Example 1 is added to the cast foundation material prepared on the basis of polyurethanes. The floor covering then has a strong antimicrobial activity, especially also against foot fungi, such as *Trichophyton mentagrophytes*, and against yeasts or bacteria, such as *Candida albicans* and *Staphylococcus aureus*, which frequently occur together with the foot fungi.

When samples of the treated cast foundation material are placed on agar dishes which have been inoculated with the micro-organisms mentioned above, the following inhibition zones are found:

Inhibition zones in mm.
*Trichophyton mentagrophytes* _____ 12
*Candida albicans* _____ 2
*Staphylococcus aureus* _____ 1

Instead of the N,N'-disubstituted imidazolone compound of Example 1 employed in Examples 4 to 6, it is also possible to use, with equally good results, the N,N'-disubstituted imidazolone compounds of Examples 2 and 3.

It is already known to use the compound of the formula

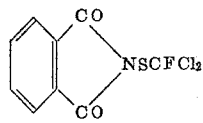

for the antimicrobial finish of materials. Compared with this compound, the compounds of the present invention are characterised by a surprisingly higher degree of activity. This can be seen from the following table giving the reciprocal inhibition values of the critical concentration for *Aspergus niger*, *Bct. coli* and *Bct. proteus*, each in the optimum nutrient medium.

TABLE

| Antimicrobial agent | Reciprocal inhibition value of critical concentration | | |
|---|---|---|---|
| | *Aspergus niger* | *Bct. coli* | *Bct. proteus* |
| ![structure 1] | >75,000 | 4,000 | >75,000 |
| ![structure 2] | >20,000 | 20,000 | 11,000 |
| ![structure 3] | >20,000 | 14,000 | 20,000 |
| ![structure 4] | >60,000 | 10,000 | >60,000 |
| ![structure 5] | 8,000 | 4,000 | 5,000 |

We claim:
1. An N,N'-disubstituted imidazolone of the formula

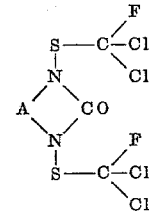

wherein A is phenylene or phenylene substituted by a member selected from the group consisting of chloro, nitro and alkyl of 1–4 carbon atoms.

2. A compound of claim 1 wherein A is phenylene.
3. A compound of claim 1 wherein A is methyl substituted phenylene, the methyl radical being attached at the 4-position.
4. A compound of claim 1 wherein A is methyl substituted phenylene, the methyl radical being attached at the 5-position.

5. A compound of claim 1 wherein A is chloro substituted phenylene, the chloro radical being attached at the 5-position.

References Cited

UNITED STATES PATENTS 3,249,620  5/1966  Kuhle et al. _____ 260—309.2

FOREIGN PATENTS 621,711  2/1963  Belgium.

NORMA S. MILESTONE, *Acting Primary Examiner.*

JOHN D. RANDOLPH, *Examiner.*

N. TROUSOF, *Assistant Examiner.*